United States Patent
Hartman et al.

(10) Patent No.: US 6,233,975 B1
(45) Date of Patent: May 22, 2001

(54) COMMON CAGE ASSEMBLY

(75) Inventors: Terry E. Hartman, Northwood, OH (US); Herbert C. Kroh, LaSalle; David E. Crots, Ottawa Lake, both of MI (US)

(73) Assignee: Libbey Glass Inc., Toledo, OH (US)

( * ) Notice: Subject to any disclaimer, the term of this patent is extended or adjusted under 35 U.S.C. 154(b) by 0 days.

(21) Appl. No.: 09/275,467

(22) Filed: Mar. 24, 1999

(51) Int. Cl.$^7$ ................................................. B29C 49/56
(52) U.S. Cl. .......................... 65/173; 65/171; 65/242; 65/321; 65/323; 65/357; 65/360; 65/361; 425/188
(58) Field of Search ............................ 65/171, 173, 242, 65/321, 323, 361, 357, 360; 425/188

(56) References Cited

U.S. PATENT DOCUMENTS

| | | |
|---|---|---|
| 1,864,689 | 6/1932 | Freese et al. . |
| 1,911,119 * | 5/1933 | Ingle . |
| 2,225,898 | 12/1940 | Benoit et al. . |
| 2,358,452 * | 9/1944 | Garstang . |
| 2,584,524 * | 2/1952 | Wyss . |
| 2,702,444 * | 2/1955 | Rowe . |
| 2,811,815 | 11/1957 | Eldred . |
| 3,149,951 | 9/1964 | Mennitt et al. . |
| 3,268,322 | 8/1966 | Denman . |
| 3,529,948 | 9/1970 | Eldred et al. . |
| 3,867,123 | 2/1975 | Hamilton . |
| 4,070,174 | 1/1978 | Nebelung et al. . |
| 4,134,748 | 1/1979 | Hileman . |
| 4,225,331 | 9/1980 | Bittner et al. . |
| 4,276,075 | 6/1981 | Olivotto . |
| 4,810,278 | 3/1989 | Braithwaite . |
| 5,059,236 | 10/1991 | Ito . |
| 5,215,566 | 6/1993 | Yamamoto et al. . |
| 5,304,229 | 4/1994 | Swanfeld . |
| 5,306,325 | 4/1994 | Smith et al. . |
| 5,308,234 * | 5/1994 | Nicke et al. . |
| 5,413,472 * | 5/1995 | Dietterich et al. . |
| 5,851,257 | 12/1998 | Kroh et al. . |

OTHER PUBLICATIONS

Catalog pages entitled "Lynch Barrel Cam Press", published by Lynch Machinery–Miller Hydro, Inc. of Bainbridge, Georgia, Undated.

Catalog pages entitled "Lynch Motor Driven Press", published by Lynch Machinery–Miller Hydro, Inc. of Bainbridge, Georgia, Undated.

* cited by examiner

Primary Examiner—Sean Vincent
(74) Attorney, Agent, or Firm—Emch, Schaffer, Schaub & Porcello, Co., L.P.A.

(57) ABSTRACT

A common cage assembly for a mold for a glassware machine having a mold support member. The assembly further includes a first cage member and a second cage member. Each of the cage members is movably mounted adjacent to the mold support member. Each of the cage members has a mold receiving surface.

13 Claims, 10 Drawing Sheets

COMMON CAGE ASSEMBLY

BACKGROUND OF THE INVENTION

The present invention relates generally to a support for a mold. More specifically, the invention is directed to a common cage assembly that includes a mold support member and first and second cage members that support a glassware mold.

Glassware pressing machines having molds are known in the art. In these prior art machines, it has been found that it is difficult to change the molds from, for example, a split mold to a block mold. It is not unusual for a complete changeover of molds to take many hours. During changeover, the glassware machine is stopped. This results in a loss of production. Therefore, there is a need for an assembly for a glassware machine that allows for the relatively quick changeover of molds.

The present invention satisfies the above-identified need. As described below, the present invention is directed to a common cage assembly that includes, among other things, a first cage member and a second cage member that readily receive, for example, either a split mold or a block mold. As it will be appreciated, the present invention allows for the relatively quick changeover of molds in a glassware machine.

SUMMARY OF THE INVENTION

The present invention is directed to a common cage assembly for a mold. The assembly includes a mold support member. The assembly further includes a first cage member and a second cage member. Each of the cage members is mounted adjacent to the mold support member. Each of the cage members has a mold receiving surface.

The primary object of the present invention is to provide a common cage assembly that allows for the quick changeover from, for example, a split mold to a block mold for a glassware machine.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
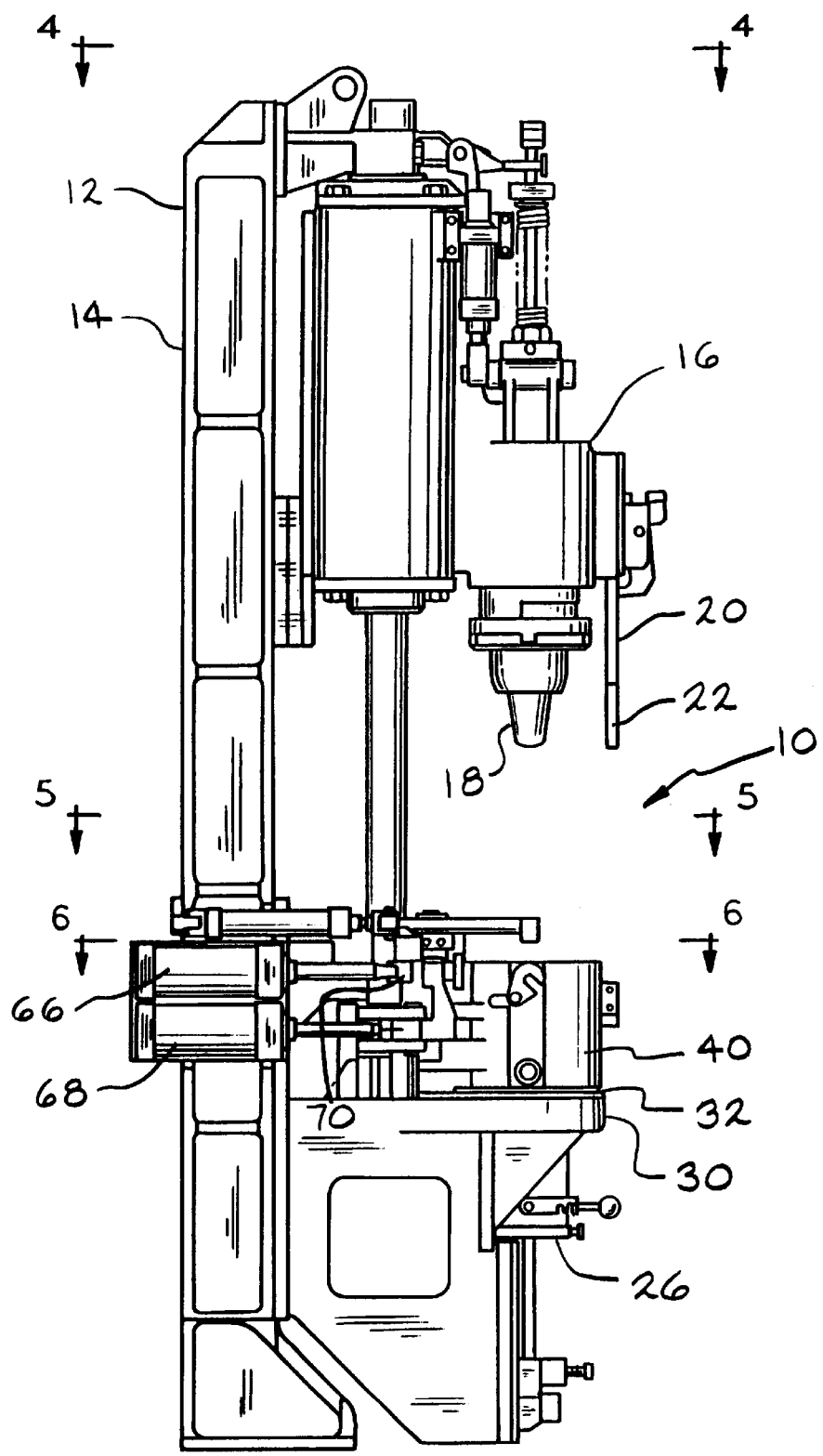
FIG. 1 is a side elevational view of a glassware machine including a common cage assembly according to the present invention.

The preferred embodiments and best mode of the present invention will now be described in detail with reference being made to the drawings. In the drawings, the common cage assembly of the present invention is indicated generally by the reference number "10".

Referring to FIGS. 1–6, the assembly 10 can be used with a glassware machine 12 having a frame 14. A press head assembly 16 is movably mounted on the frame 14. The press head assembly 16 includes a plunger 18 and a cage grip assembly 20 having a first tine 22 and a second tine 24. The glassware machine 12 further includes a valve adjustment assembly 26.

A plurality of glassware machines 12 is usually mounted on a rotating carousel (not shown). In a typical embodiment, twenty-four glassware machines 12 are mounted on the carousel.

Figure 6:
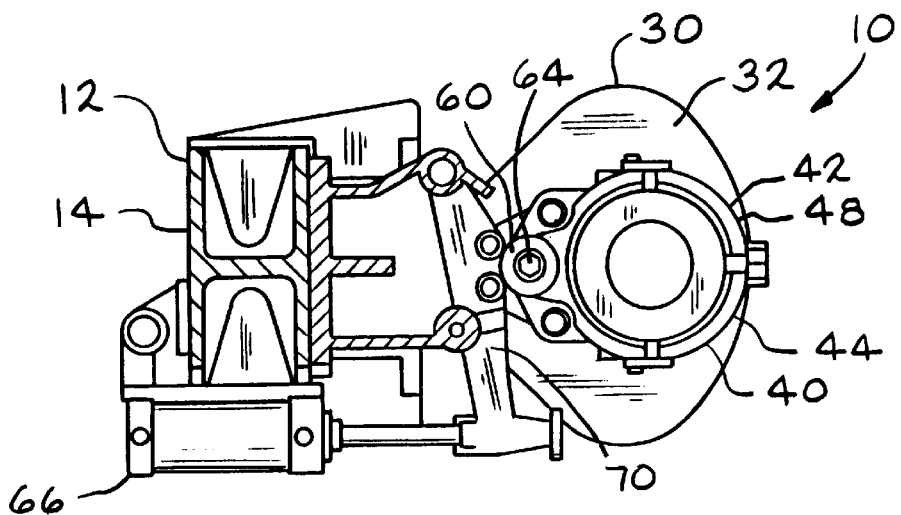
FIG. 6 is a cross-sectional view taken along line 6—6 of FIG. 1.
Figure 7:
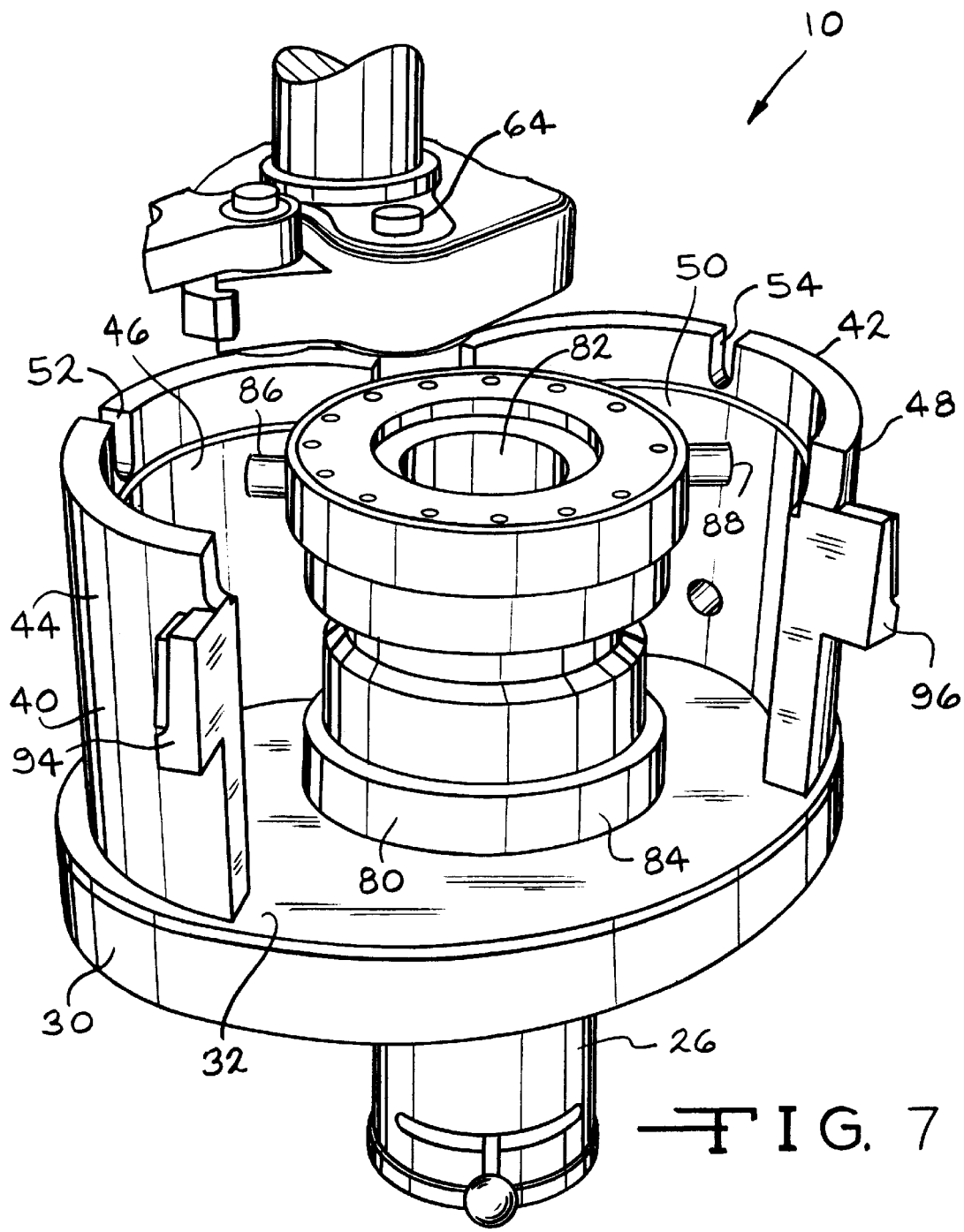
FIG. 7 is a perspective view of the common cage assembly of the present invention with a block mold.
Figure 8:
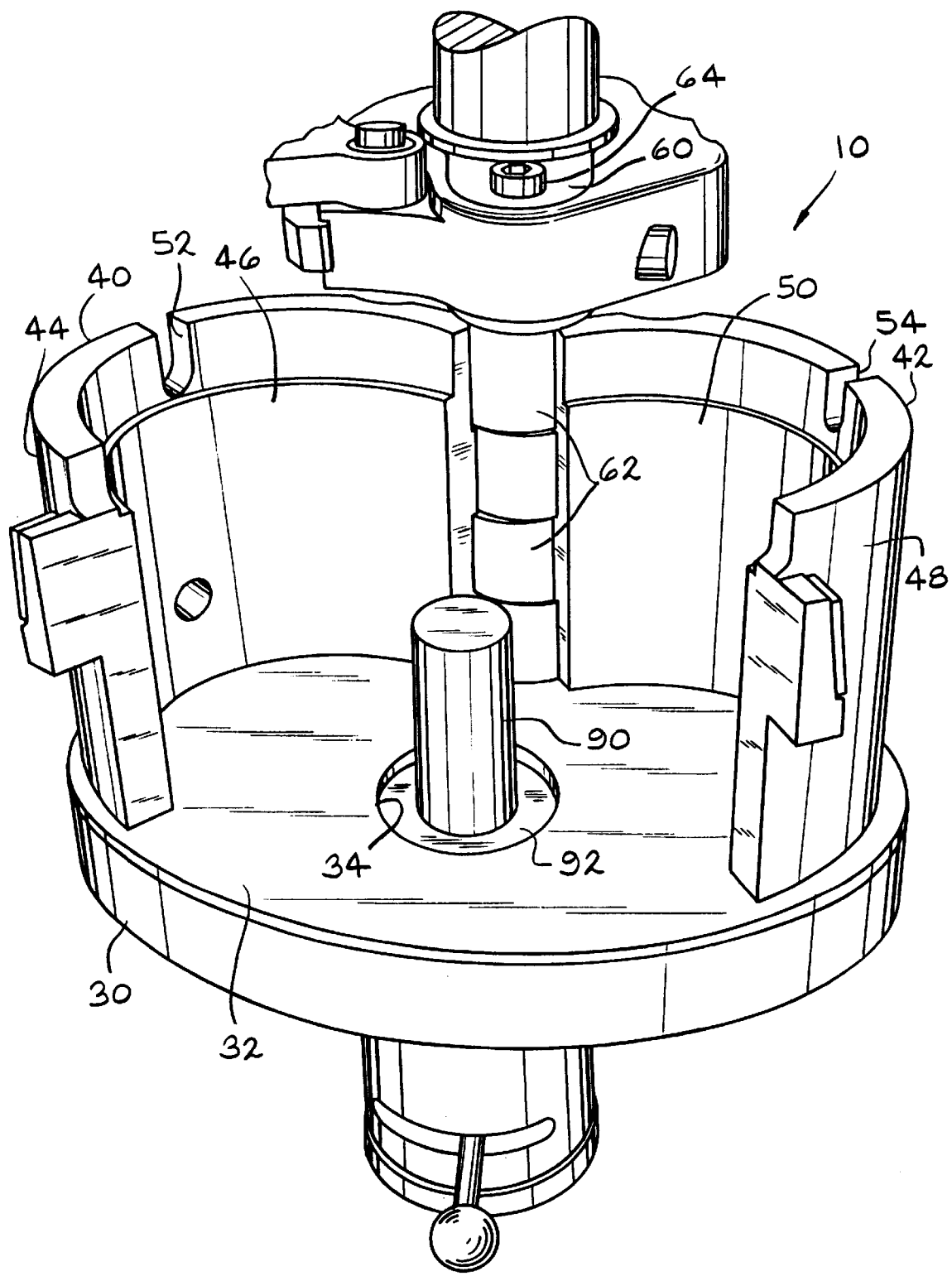
FIG. 8 is a perspective view of the common cage assembly with a block mold valve.

Referring to FIGS. 1–3 and 6–8, the common cage assembly 10 of the present invention includes a mold support member 30 fixedly mounted on the frame 14 of the glassware machine 12. The mold support member 30 includes a generally horizontal upper surface 32. As shown in FIG. 8, the mold support member 30 defines a valve opening 34.

Still referring to FIGS. 1–3 and 6–8, the assembly 10 includes a first cage member 40 and a second cage member 42. The first cage member 40 includes a first exterior surface 44 and a first interior surface 46. The second cage member 42 includes a second exterior surface 48 and a second interior surface 50. As described below, the first and second interior surfaces 46 and 50 are configured, sized or adapted to receive a mold. In this regard, the first and second interior surfaces 46 and 50 define first and second mold pin receiving openings 52 and 54, respectively.

Referring to FIGS. 1 and 6–8, the first and second cage members 40 and 42 are pivotally mounted on the glassware machine 12 adjacent to the mold support member 30. As best shown in FIGS. 6 and 8, the assembly 10 includes a hinge assembly 60 that allows for the pivotal movement of the first and second cage members 40 and 42. The hinge assembly 60 includes interleaved hinge projections 62 that extend from the first and second cage members 40 and 42. The hinge members 62 are pivotally mounted on a hinge pin 64 that extends through the hinge members 62. The hinge assembly 60 allows the first and second cage members 40 and 42 to pivot between a closed position as shown in FIG. 6 to an open position as shown in FIG. 8.

Referring to FIGS. 1, 6 and 8, the first and second cage members 40 and 42 are operatively connected to cage operating cylinders 66 and 68 through conventional linkage 70. Actuation of the cage operating cylinders 66 and 68 causes pivotal movement of the first and second cage members 40 and 42 between the closed and open positions as shown in FIGS. 6 and 8.

Figure 9:
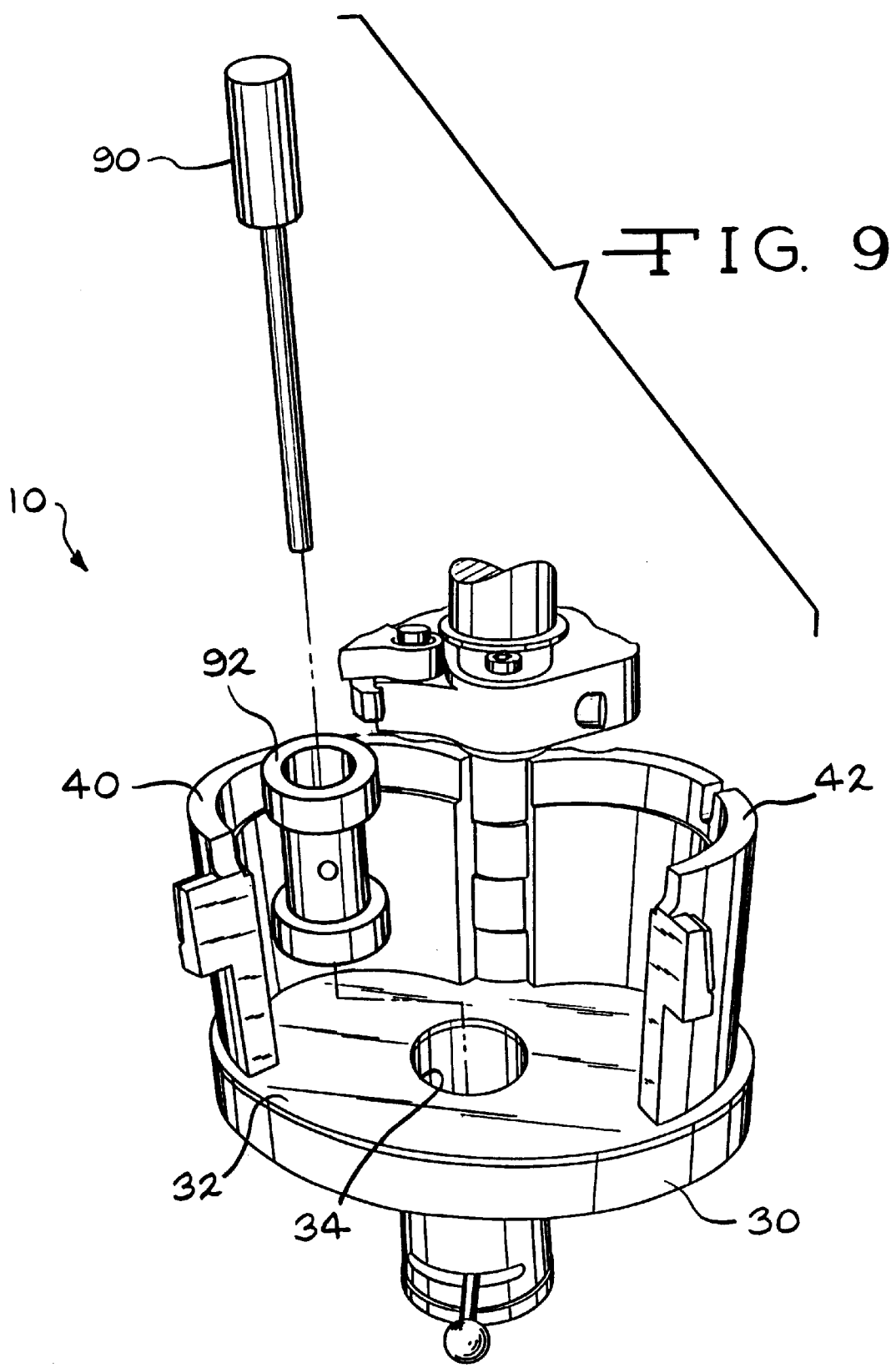
FIG. 9 is a perspective view of the common cage assembly with the block mold valve and the block mold valve bushing removed from the assembly.

Referring to FIGS. 7–9, the assembly 10 can include a one-piece or block mold 80. The mold includes a glassware forming interior surface 82 and a generally cylindrical exterior surface 84. The first and second interior surfaces 46 and 50 of the first and second cage members 40 and 42, respectively, have generally cylindrical configurations that receive at least a portion of the exterior surface 84 of the mold 80 when the cage members 40 and 42 are in the closed position. As shown in FIG. 7, the exterior surface 84 of the mold 80 includes first and second mold pins 86 and 88. The mold pins 86 and 88 are received by the first and second mold pin receiving openings 52 and 54 of the first and second cage members 40 and 42, respectively, when the cage members 40 and 42 are in the closed position.

Referring to FIG. 8, the assembly 10 can include a block valve 90 having a block bushing 92 positioned in the valve opening 34. When the block mold 80 is positioned on the mold support member 30, as shown in FIG. 7, the block valve 90 extends into the interior of the mold. As shown in FIG. 9, the block valve 90 and the block valve bushing 92 are removable from the valve opening 34 of the mold support member 30 of the assembly 10.

Figure 2:
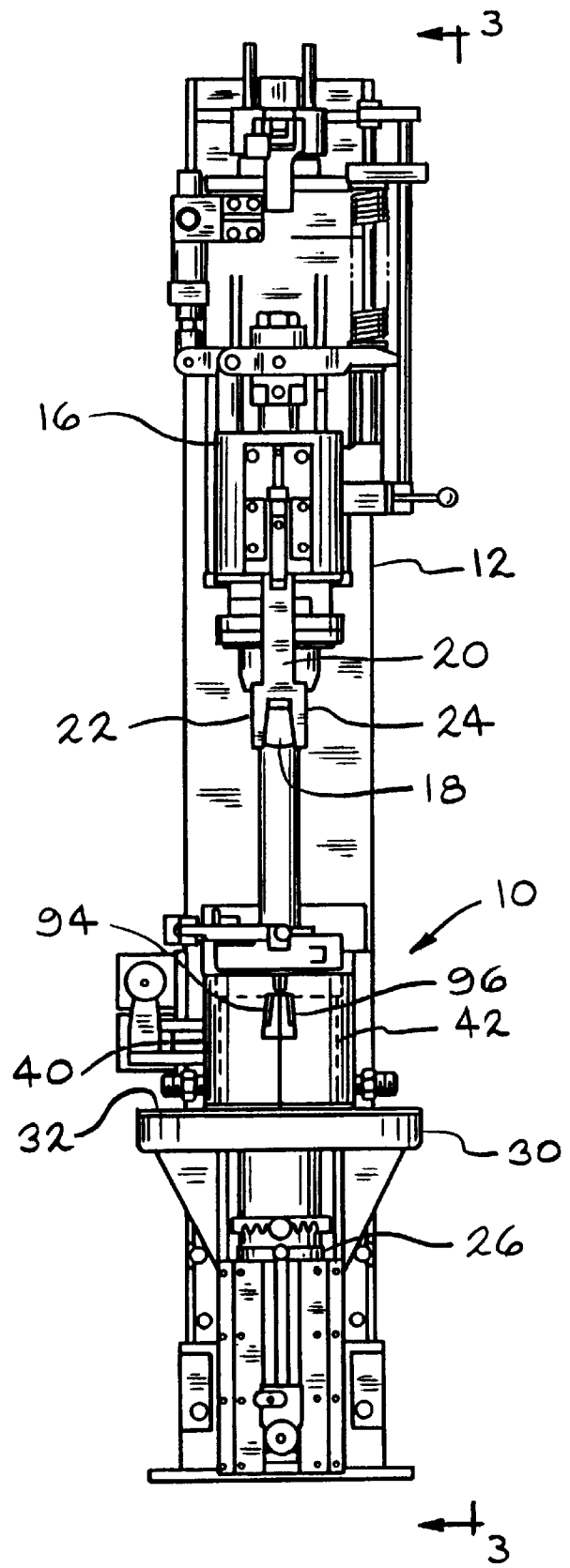
FIG. 2 is a front elevational view of the glassware machine shown in FIG. 1.
Figure 3:
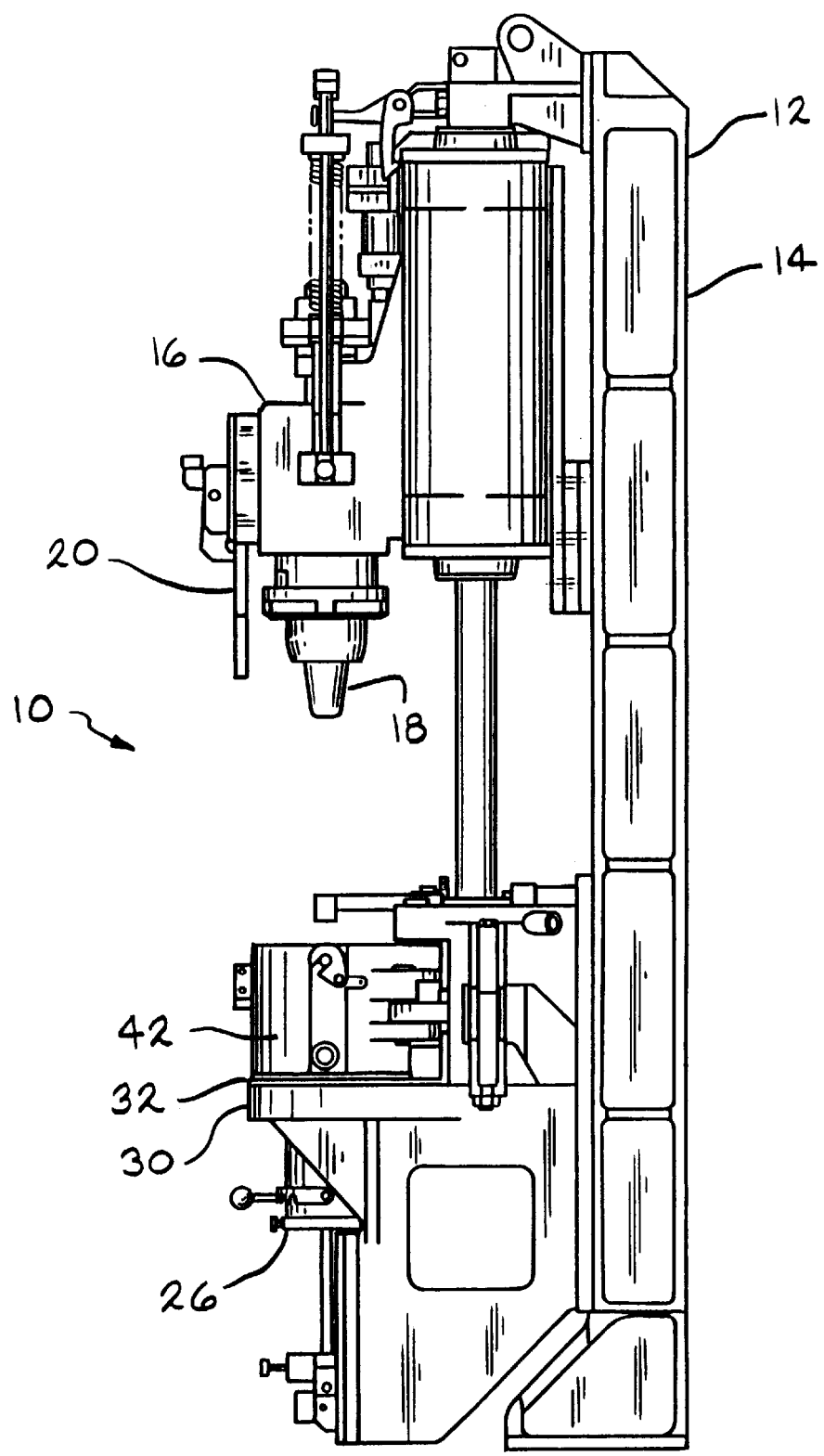
FIG. 3 is a view taken along line 3—3 of FIG. 2.
Figure 4:
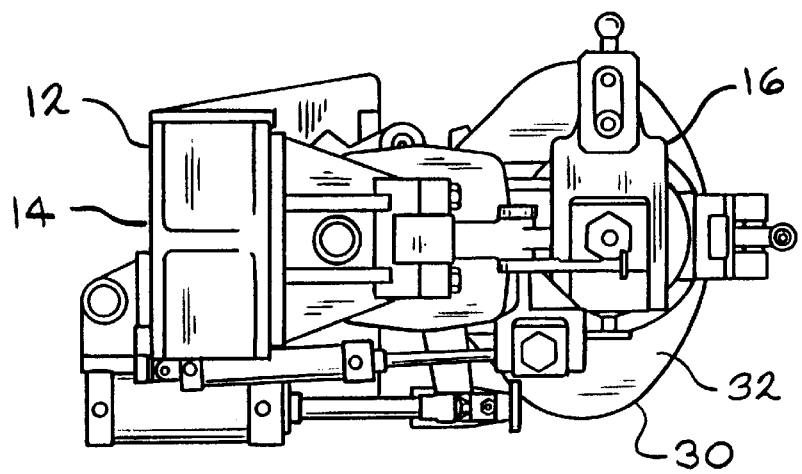
FIG. 4 is a view taken along line 4—4 of FIG. 1.
Figure 5:
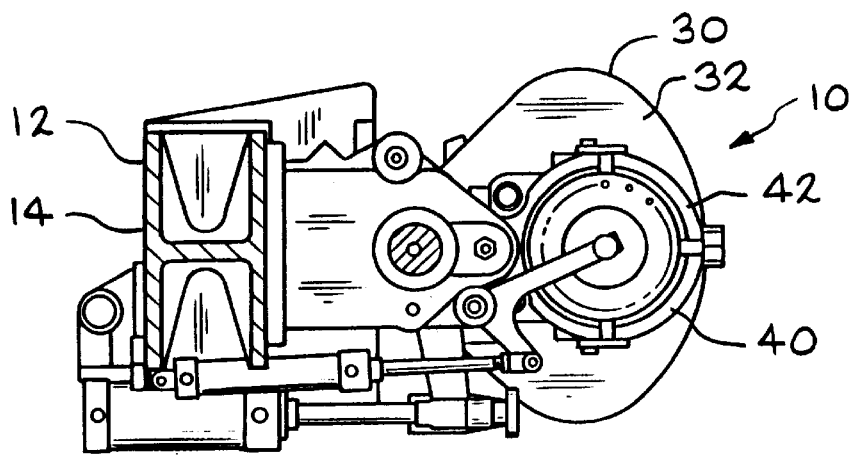
FIG. 5 is a cross-sectional view taken along line 5—5 of FIG. 1.

Referring to FIGS. 2 and 7, the first and second cage members 40 and 42 include first and second cage holders 94 and 96. The first and second cage holders 94 and 96 are configured, sized or adapted to be received by the first and second tines 22 and 24, respectively, of the cage grip assembly 20 of the press head assembly 16. The engagement of the first and second tines 22 and 24 with the first and second cage holders 94 and 96 maintains the first and second cage members 40 and 42 in the closed position.

Figure 10:
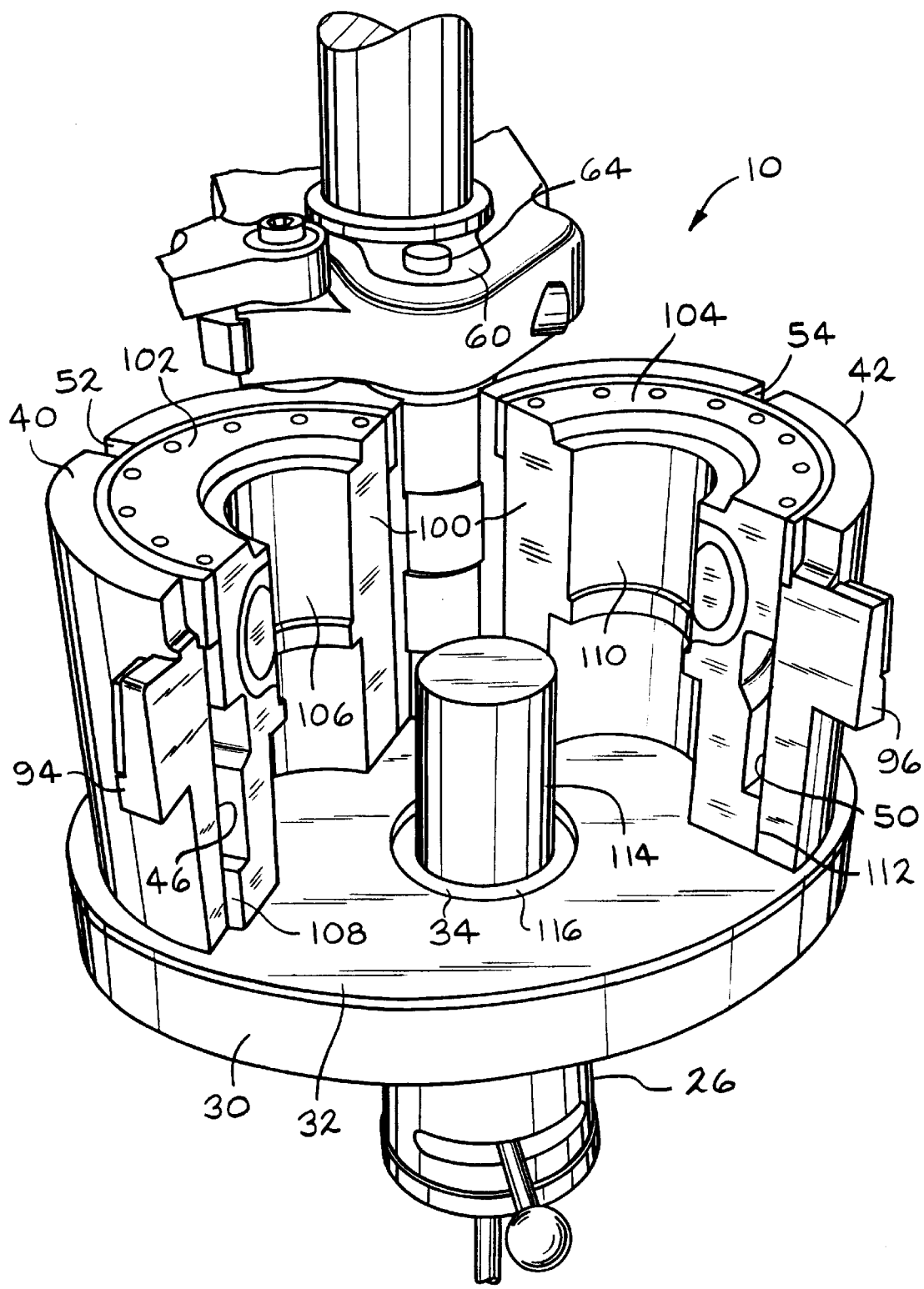
FIG. 10 is a perspective view of the common cage assembly of the present invention with a split mold.
Figure 11:
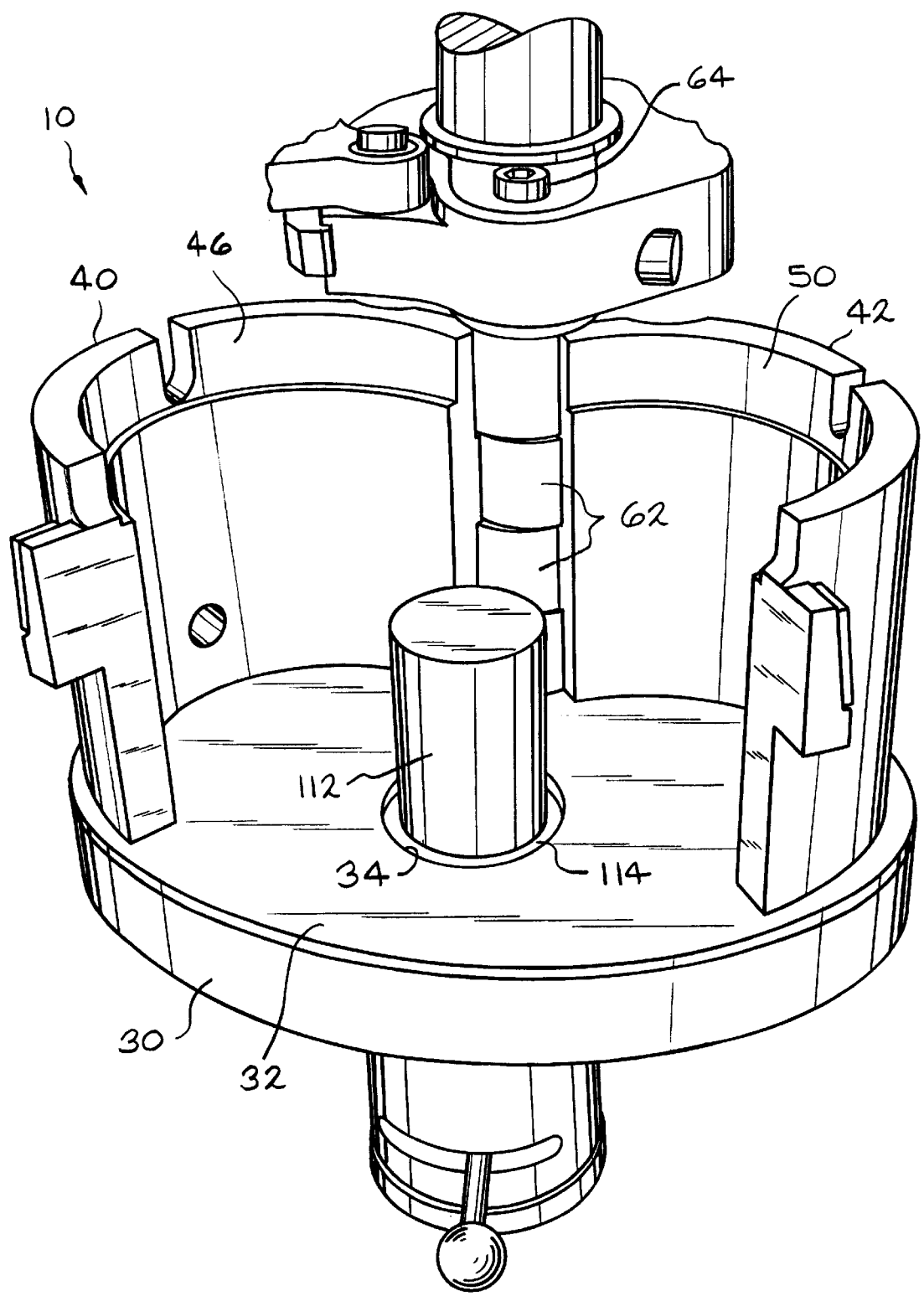
FIG. 11 is a perspective view of the common cage assembly with a split mold valve.
Figure 12:
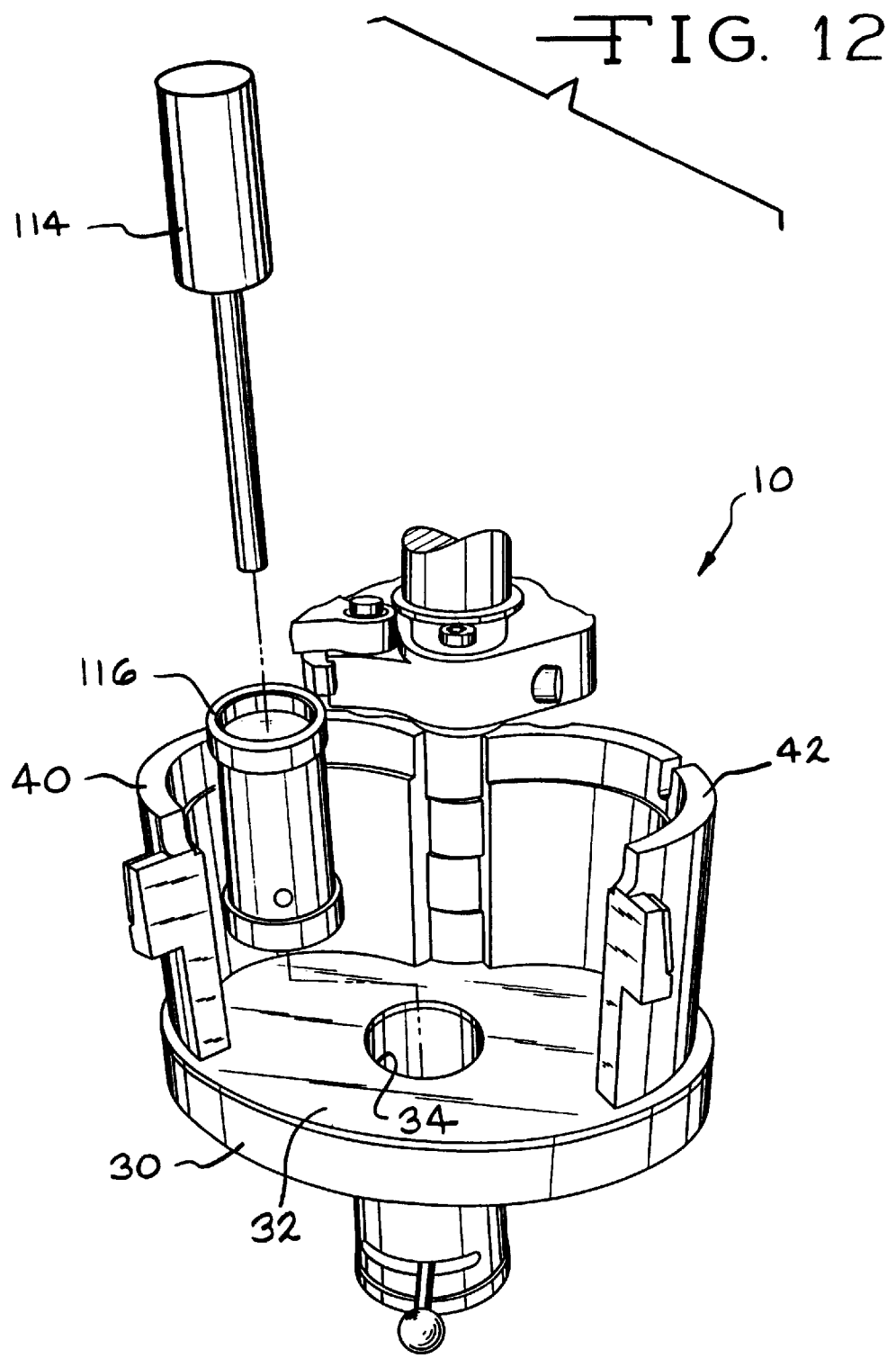
FIG. 12 is a perspective view of the common cage assembly with the split mold valve and the split mold valve bushing removed from the assembly.

Referring to FIGS. 10–12, the assembly 10 can include a two-piece or split mold 100 having a first mold half 102 and a second mold half 104. The first mold half 102 includes a glassware forming interior surface 106 and a generally cylindrical first mold exterior surface 108. At least a portion of the first mold exterior surface 108 is received by the first interior surface 46 of the first cage member 40. The second mold half 104 includes a glassware forming interior surface 110 and a second mold exterior surface 112. At least a portion of the second mold exterior surface 112 is received by the second interior surface 50 of the second cage member 42.

Referring to FIGS. 11 and 12, the assembly 10 can include a split mold valve 114 and a split mold valve bushing 116. The split mold valve 114 and the split mold valve bushing are removably positioned in the valve opening 34 of the mold support member 30.

Referring to FIGS. 1 and 7–12, the operation of the assembly 10 will now be described. When mold changeover is desired from, for example, a block mold 80 to a split mold 100, the first and second cage members 40 and 42 are pivotally moved to the open position as shown in FIG. 7. The block mold 80 is removed from the mold support member 30. The removal of the block mold 80 exposes the block valve 90 and the block valve bushing 92 as shown in FIG. 8. The block valve 90 and the block valve bushing 92 can then be removed from the valve opening 34 of the mold support member 30 as shown in FIG. 9.

Referring to FIGS. 10–12, a split mold 100 having first and second mold halves 102 and 104 can be positioned adjacent to the first and second cage members 40 and 42, respectively. A split mold valve 114 and a split mold valve bushing 116 are inserted in the valve opening 34 of the mold support member 30 as shown in FIGS. 10 and 11. When mold changeover is again desired, the above-described operation can be repeated.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A common cage assembly for a glassware mold comprising:
   a mold support member including a generally horizontal, planar upper surface;
   a glassware mold having at least one exterior surface being positioned on said upper surface of said mold support member, said glassware mold including at least one mold pin fixedly attached to said at least one exterior surface; and
   a first cage member and a second cage member, each of said cage members being pivotally mounted adjacent to said mold support member, each of said cage members being adapted to receive at least a portion of said exterior surface of said glassware mold, at least one of said cage members including a mold pin receiving opening for receiving said at least one mold pin.

2. The assembly of claim 1, wherein said assembly further includes a mold valve.

3. The assembly of claim 2, wherein said upper surface of said mold support member defines an opening for receiving said mold valve.

4. The assembly of claim 1, wherein said assembly further includes pivot means operatively connected to each of said cage members for pivotally mounting said cage members adjacent to said mold support member.

5. The assembly of claim 4, wherein said pivot means consists of a hinge pin operatively connected to at least one hinge member mounted on each of said cage members.

6. The assembly of claim 1, wherein said assembly further includes actuation means operatively connected to each of said cage members for actuating said cage members.

7. The assembly of claim 6, wherein said actuation means consists of at least one fluid cylinder.

8. The assembly of claim 1, wherein said glassware mold is one-piece.

9. The assembly of claim 1, wherein said glassware mold is two-piece.

10. The assembly of claim 1, wherein said assembly further includes an adjustable mold valve.

11. The assembly of claim 10, wherein said mold valve includes a bushing.

12. The assembly of claim 1, wherein said first and second cage members include first and second cage holders, respectively.

13. The assembly of claim 12, wherein said assembly further includes first and second tines for engaging said first and second cage holders.

* * * * *